United States Patent [19]

Meier

[11] Patent Number: 4,833,886
[45] Date of Patent: May 30, 1989

[54] INTERNAL COMBUSTION ENGINE SUPERCHARGED BY MEANS OF AN EXHAUST GAS TURBOCHARGER

[75] Inventor: Erwin Meier, Remetschwil, Switzerland

[73] Assignee: BBC Brown, Boveri & Company, Ltd., Baden, Switzerland

[21] Appl. No.: 241,778

[22] Filed: Sep. 7, 1988

Related U.S. Application Data

[63] Continuation of Ser. No. 539,133, Oct. 5, 1983, abandoned.

[30] Foreign Application Priority Data

Nov. 2, 1982 [CH] Switzerland .................... 6355/82

[51] Int. Cl.[4] .............................................. F02B 37/12
[52] U.S. Cl. ........................................ 60/602; 60/606
[58] Field of Search ................. 60/600, 601, 602, 603, 60/606

[56] References Cited

U.S. PATENT DOCUMENTS

| 1,816,787 | 7/1931 | Moss | 60/602 |
| 2,379,455 | 7/1945 | Prince | 60/606 X |
| 4,215,550 | 8/1980 | Dinger et al. | 60/606 |

FOREIGN PATENT DOCUMENTS

| 1451910 | 7/1969 | Fed. Rep. of Germany | 60/606 |
| 1012365 | 4/1952 | France | 60/602 |

Primary Examiner—Michael Koczo
Attorney, Agent, or Firm—Burns, Doane, Swecker & Mathis

[57] ABSTRACT

In a diesel engine (1) supercharged by an exhaust gas turbocharger, both the compressor (4) and the turbine (3) of the supercharger are designed for full engine power and speed. A by-pass duct (8) provided with a non-return valve (9) and a control device (10) is connected between the exhaust gas duct (9) and the boost air duct (5). The turbine (3) is equipped with means (11, 12, 13) for varying the turbine equivalent cross-section. At part load, the equivalent cross-section and, simultaneously, the by-pass duct cross-section are varied in order to operate as near as possible to the surge limit of the compressor (4).

2 Claims, 2 Drawing Sheets

INTERNAL COMBUSTION ENGINE SUPERCHARGED BY MEANS OF AN EXHAUST GAS TURBOCHARGER

This application is a continuation, of application Ser. No. 539,133, filed Oct. 5, 1983, now abandoned.

The invention concerns an internal combustion engine, particularly diesel engine, supercharged by means of an exhaust gas turbocharger, and having a compressor, which is designed for full engine speed, and a by-pass duct connecting the boost air duct with the exhaust gas duct, in which by-pass duct are located a control device and a non-return valve, as well as means for variable admission to the exhaust gas turbine.

Systems of the type mentioned at the beginning are known, for example from German Patent No. 1,451,910. In order, in this case, to permit the boost pressure and the torque to increase with decreasing engine speed, in order, by this means, to match the torque characteristic to the ideal tractive force hyperbola, the air quantity flowing from the boost air duct to the exhaust gas duct is increased. Since, however, this measure alone does not suffice, the means for varying the admission to the exhaust gas turbine consists in supplying an additional amount of energy, which is also increased with decreasing engine speed, to the turbine. This preferably occurs in the form of separately produced compressed air, which is supplied to a special nozzle segment of the exhaust gas turbine at a rate according to the rate of by-passed air or the air rate currently required by the engine. In this arrangement, the compressor can be so designed that its optimum efficiency is near the engine absorption line at maximum engine speed.

Another known solution for engines with low compression ratio and high boost pressures is the method known under the name of HYPERBAR. In this case, additional by-passed boost air is supplied to the exhaust gas turbine in addition to the exhaust gases of the internal combustion engine, which by-passed boost air is heated by fuel combustion in a combustion chamber located before the turbine.

Disadvantageous in both known methods is the increased energy consumption over the whole load range.

The object of the invention is, therefore, in a highly supercharged internal combustion engine of the type mentioned at the beginning, operating with "constant pressure turbocharging" or on a principle similar to "constant pressure turbocharging", to increase the boost pressure at part load without the aid of outside energy. "Similar to constant pressure" here indicates systems such as the MULTISTOSS method or the method known under the name MPC (Modular Pulse Converter).

According to the invention, this object is achieved by designing the exhaust gas turbine so that it has an equivalent nozzle area designed for getting the desired turbine power output and subsequently the desired boost pressure at full engine speed and load, the nozzle area being variable in the form of a known sector regulator or a variable geometry of the turbine diffuser guide vanes.

The turbine equivalent nozzle arm is regarded the cross-section of an isentropic flow nozzle having the same flow capacity as the turbine.

German Patent No. 1,451,910, mentioned at the beginning, does in fact disclose the provision of a gas turbine with separate nozzle chambers. However, these only serve to accept the exhaust gases of different cylinders connected together on the exhaust side. Complete switching off or throttling of one or more of these chambers, which measures would lead to a variable equivalent nozzle area, is not possible.

On the other hand, the actual reduction of the inlet flow cross-section of a turbocharger gas turbine has been known for a long time. As early as 1923, BUECHI (Swiss Patent No. 107,453) showed and described a control device via which the exhaust gases reach the turbine and by means of whose adjustment the turbine power can be increased or reduced. The type of device shown there corresponds to sector regulation. German Patent No. 2,840,201, for example, shows a more modern solution. In this patent, the cross-section in the inlet duct of an axial turbine is sub-divided by means of partitions into several annular partial ducts in radially stacked arrangement. These partial ducts can be switched on or off depending on the operating condition of the internal combustion engine. The optimum flow to the turbine in each power range is intended, in this case, to lead to good acceleration behaviour. This known solution, however, offers no remedy for the fact that in the case of highly supercharged engines and where a turbocharger with a high overall efficiency is used, the compressor pressure ratio can become unallowably high when the reduction in the turbine equivalent cross-section occurs.

The advantage of the invention may be seen in the fact that, using relatively simple means, the propeller part-load operation is improved without adverse effect on the operating characteristics at full load. At reduced engine speed, the boost air pressure can be raised so high that mean effective pressures even higher than those necessary according to the propeller law are attained.

An embodiment example of the invention is shown simplified in the drawing, in which FIG. 1 shows a supercharged four-cylinder internal combustion engine schematically;

Figure 1:
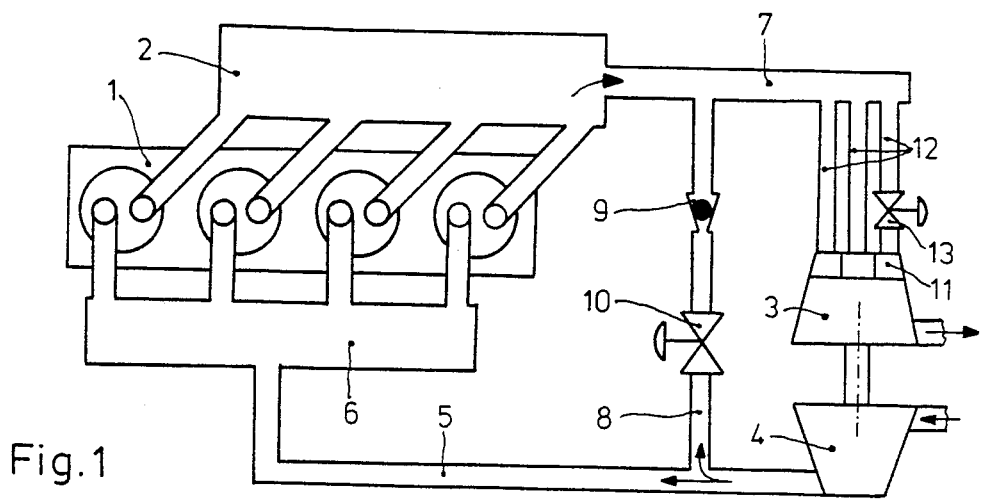

The internal combustion engine shown in FIG. 1 is a medium speed four-stroke diesel engine 1, as is used for ship propulsion. The exhaust gases of the individual cylinders flow into a common exhaust plenum chamber 2, in which the pressure pulses even out. The exhaust gases arrive via the exhaust gas duct 7 with almost constant pressure at the turbine 3, which consequently operates according to the constant pressure turbocharging principle. The compressor 4 driven by the turbine 3 supplies the air, induced from the atmosphere and then compressed, via the boost air duct 5 to a boost air plenum chamber 6, from which it flows to the individual cylinders.

A by-pass duct 8 is connected for by-pass operation between the boost air duct 5 and the exhaust gas duct 7, in which by-pass duct are located a non-return valve 9 and a control device 10. The former serves to prevent the flow of exhaust gas into the boost air duct 5 when the control device 10 is open under conditions in which the exhaust gas pressure is higher than the boost pressure. The by-pass duct 8 and the control device 10 are respectively dimensioned to accept air at approximately 30% of the exhaust gas quantity flowing through duct 7. The control and/or the operation of the control device occurs, in a manner known per se, by means of a process variable or an operating variable such as, for example, the engine speed, boost pressure, injection pump control rod displacement, etc.

The compressor 4 is a radial-flow compressor and is so designed that its optimum efficiency occurs at maximum engine power and speed and it operates near the surge limit.

In the case of an engine selected for ship propulsion, a propeller characteristic operating line has to be followed, which means that with falling rotational speed, the mass flow also decreased and, in the absence of counter measures, the boost pressure would fall rather sharply. Bypassing alone, however correctly it may be controlled, an provide no remedy in this case. As will be shown later, the boost pressure can only be increased insignificantly by means of this measure; which is why the known solutions mentioned at the beginning supply outside energy.

According to the invention, the turbine 3 is also designed for full engine speed and power. It follows from this that in the design range, i.e. in the upper load and speed range of the engine, the by-pass duct 8 remains closed. In addition, a variable equivalent cross-section is provided for the turbine. This can, for example, occur within the turbine itself using variable guide vanes or by means of the switching on or off of radial annular sectors. In conventional turbines, which are provided with several separate gas inlets, this occurs by means of switching off one or more nozzle ring sectors. The choice is, in the end, a question of economy and operational safety. It is therefore necessary to ensure, among other things, that the slag deposits unavoidable with heavy oil operation do not adversely effect the adjustment capability or have too much influence on the efficiency.

The overall turbocharger efficiency has, in fact, a decisive influence in the case of highly supercharged engines whose exhaust gas turbines operate with variable equivalent cross-section. If the equivalent nozzle area is reduced in these cases, the compressor pressure ratio also increases in such systems but only, however, if the scavenging pressure drop across the engine is not substantially reduced, i.e. only if the overall efficiency is high. If the latter is too low, the reduction of the equivalent cross-section only causes a collapse in the scavenge air throughput without simultaneously increasing the compressor pressure ratio.

All of which indicates that a turbine with variable equivalent cross-section must have a very high efficiency over the whole adjustment range.

In the present example, the turbine 3 has three nozzle segments 11 located around the periphery, each of which nozzle segments is supplied by a duct 12. One of these ducts is provided with a shut-off device 13 immediately before the turbine, which shut-off device gives a reduction in the nozzle admission area of 33.3%. Should such a large step change not be desired, a modified turbine inlet casing with a multiplicity of small separate nozzle ring sectors can, of course, come into use. Fine staging of the admission area can then occur by means of successively switching off several of these sectors.

In the part-load range, the objective now is to displace the operating point as near as possible to the surge limit by simultaneously opening the by-pass duct and altering the nozzle area, i.e. to obtain the largest possible boost pressure with the best possible efficiency.

Figure 2:
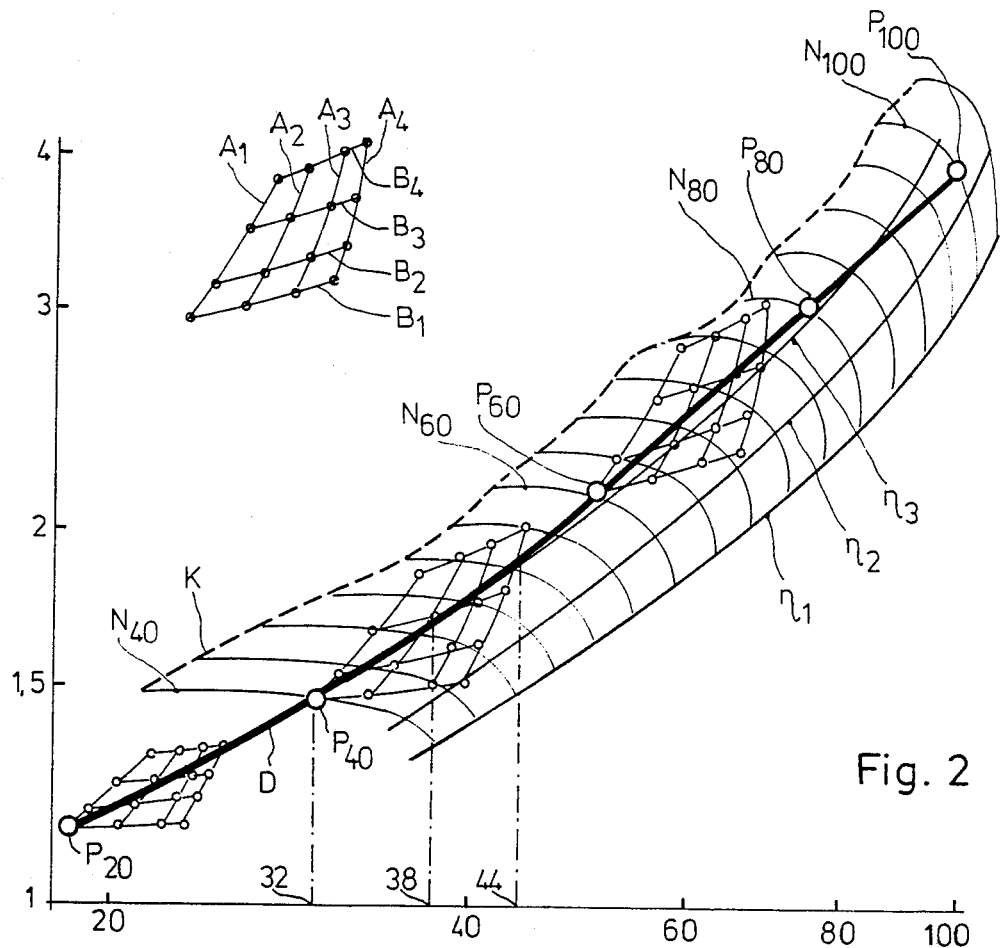
FIG. 2 shows a supercharger characteristic diagram.

In FIG. 2, a supercharger characteristic diagram shows how the by-pass control and the variation of the turbine equivalent cross-section are mutually and advantageously complementary. The boost pressure in (bar) is plotted on the ordinate and the boost air quantity in (%) on the abscissa. The surge limit K, shown as a dotted line separates the unstable and unused region from the stable region of the compressor. $\eta_1$, $\eta_2$ and $\eta_3$ are the conchoids of constant compressor efficiency, $\eta_1$ corresponding to 65% and $\eta_3$ to 82% in the present example. The lines of constant rotational speed are plotted at $N_{40}$, $N_{60}$, $N_{80}$ and $N_{100}$, the engine power output in (%) corresponding to the index in each case. D indicates the operating line which, acording to the invention, runs at an optimum distance from the surge limit K. This effective operating line already takes account of the reduction in efficiency caused by the partial closing of the nozzle area.

The mode of operation of the invention is explained below at the 40% engine power operating point. The point $P_{40}$ corresponds initially to a method of operation with fully open turbine and fully closed by-pass duct. If only the turbine admission area were decreased, an increase of the boost pressure towards the line $A_1$ would occur with increasing supply quantity, which would cause the operating point to approach the surge limit in an unallowable manner. If, on the other hand, only the by-pass duct were opened, there would only be a weak increase in pressure towards the line $B_1$.

The relationship between the lines A and B is explained in the diagram sketched in the unstable area. The lines running steeply from bottom left to top right represent different by-pass openings SB as a ratio to the currently open turbine area ST. The left-hand line $A_1$ represents the completely closed by-pass, i.e. SB/ST=0. The lines $A_2$, $A_3$ and $A_4$ stand respectively for the section ratios SB/ST=0.1, 0.2 and 0.3. The lines $B_1$ to $B_4$ starting from $A_1$ each refer to the degree of opening of the turbine, $B_1$ standing for 100% nozzle admission area, $B_2$ for 90%, $B_3$ for 80% and $B_4$ for 70%.

In order to be able to operate along the desired operating line, it can be seen that both measures must be used simultaneously. At the operating point shown, the increase in the supply quantity from approximately 32% to 44% occurs in such a way that as approximately 38% boost air quantity the turbine equivalent cross-section is 80% and the open cross-section of the by-pass duct is 10% of the turbine cross-section. It is, of course, possible to move through the whole range limited by the parallelogram in any given manner, which is, in the end, purely on exercise in control technology. It will, however, always be the object to operate in the region of stable flow and the best possible efficiency.

The differing steepness of the lines A or B shown at the load points $P_{20}$, $P_{40}$ and $P_{60}$ is, among other things, a result of the differing exhaust gas temperatures and overall turbocharger efficiencies then prevailing. It should also be noted that in the range from 80% to 100% engine power, it is no longer necessary to operate the control because, in this region, the boost pressure is sufficiently high and the turbocharger is operating in its design range in any case.

Figure 3:
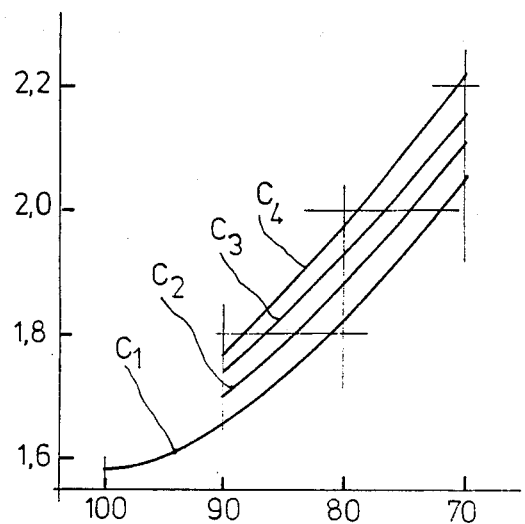
FIG. 3 shows a diagram of the combustion air ratio as a function of the turbine equivalent cross-section.
Figure 4:
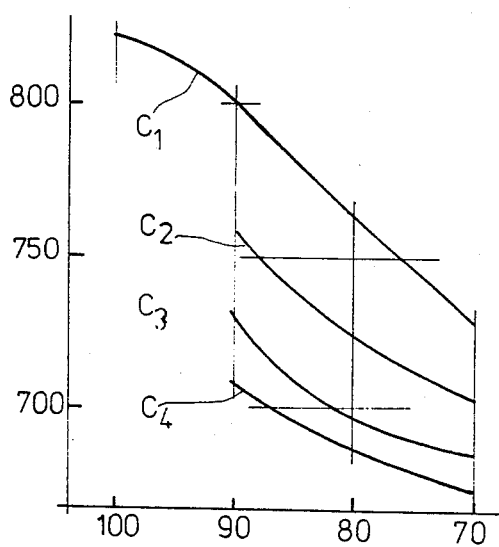
FIG. 4 shows a diagram of the exhaust gas temperature as a function of the turbine equivalent cross-section.
Figure 5:
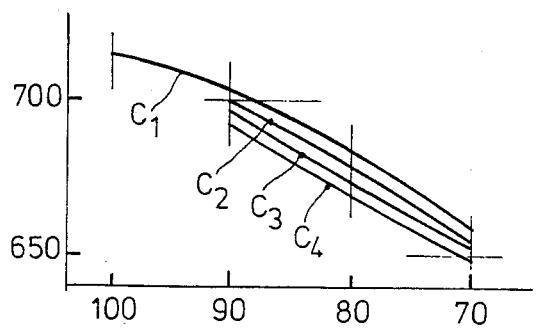
FIG. 5 shows a diagram of the valve seat temperature as a function of the turbine equivalent cross-section.

The diagrams of FIGS. 3, 4 and 5 show the outstanding results which are achieved using the measures according to the invention and they are shown, again, for the operating point at 40% engine power. The turbine admission area is given in (%) in each case on the abscissa. The combustion air ratio $\lambda_Z$ is plotted on the ordinate in FIG. 3, the exhaust gas temperature in (Kelvin) on the ordinate in FIG. 4 and the valve seat temperature of the exhaust valve in (Kelvin), which is very important to the engine manufacturer, on the ordinate in FIG. 5. The parameter is again the ratio of the opening of the by-pass section SB to the current turbine admission area ST. In each of the three diagrams, $C_1$ indicates the line for which the by-pass duct is closed. $C_2$, $C_3$ and $C_4$ correspond to the ratios SB/ST=0.1, 0.2 and 0.3, respectively.

Immediately apparent is the advantageous and directly functional relationship between the simultaneous measures "reduction of the nozzle area" and "opening the by-pass duct" at part load. It is obvious that due to the increased combustion air ratio, there is a resulting corresponding reduction in the indicated fuel consumption.

What is claimed:

1. Reciprocating internal combustion engine of the type supercharged by means of an exhaust gas turbocharger, comprising: a compressor having predetermined pressure mass flow characteristics and a bypass duct for matching the pressure mass flow characteristics to predetermined operating characteristics of the engine so as to effect stable compressor operation and optimum compressor efficiency at maximum speed and power of the engine, said bypass duct connected to a boost air duct and an exhaust gas duct, said boost air duct connected to the compressor outlet and an engine inlet, said exhaust gas duct connected to an engine outlet and to a plurality of inlet ducts, each of said plurality of inlet ducts having a first end directly connected only to said exhaust gas duct, said plurality of inlet ducts having a second end directly connected only to a plurality of nozzle segments connected to said turbine, said bypass duct being provided with a control device and a nonreturn valve, and a sector regulator for varying admission of exhaust gases to the turbine, wherein the turbine has an equivalent nozzle area for obtaining optimum turbine power output and boost pressure at said maximum engine power and speed and is driven only by said exhaust gases.

2. Reciprocating internal combustion engine of the type supercharged by means of an exhaust gas turbocharger, comprising: a compressor having predetermined pressure mass flow characteristics and a bypass duct for matching the pressure mass flow characteristics to predetermined operating characteristics of the engine so as to effect stable compressor operation and optimum compressor efficiency at maximum speed and power of the engine, said bypass duct connected to a boost air duct and an exhaust gas duct, said boost air duct connected to the compressor outlet and an engine outlet and to a plurality of inlet ducts, each of said plurality of inlet ducts having a first end directly connected only to said exhaust gas duct, said plurality of inlet ducts having a second end directly connected only to a plurality of nozzle segments connected to said turbine, said bypass duct being provided with a control device and a nonreturn valve, and a sector regulator for varying admission of exhaust gases to the turbine, wherein the turbine has an equivalent nozzle area for obtaining optimum turbine power output and boost pressure at said maximum engine power and speed and is driven only by said exhaust gases.

* * * * *